Patented Dec. 10, 1935

2,024,026

UNITED STATES PATENT OFFICE 2,024,026

RECOVERING LITHIUM COMPOUNDS

John Harry Coleman and Ned E. Jaffa, Elizabeth, N. J., assignors to The Warner Chemical Company, New York, N. Y., a corporation of New Jersey No Drawing. Application November 17, 1933, Serial No. 698,542

11 Claims. (Cl. 23—33)

This invention relates to recovering lithium compounds; and it comprises a method of recovering lithium compounds from lithiferous native phosphates of aluminum, such as amblygonite, with utilization of the $P_2O_5$ and the $Al_2O_3$ content wherein such a phosphate is extracted with a caustic soda solution, whereby taking phosphate of alumina into solution and leaving a residue containing the lithium, extracting this residue with acid and frictionally precipitating the acid solution first with an alkali to free it of impurities and then with a reagent precipitating a lithium compound; all as more fully hereinafter set forth and as claimed.

Lithium is one of the rarer elements and its compounds are seldom manufactured on any large scale. The methods used in the production of compounds of either potassium or of sodium are obviously not applicable, because of the difference in properties. Manufacture is ordinarily by what are, more or less, laboratory methods; these usually involving furnacing operations. One of the common sources, lepidolite, is a mica with the refractory characteristics of the micas; it is a material difficult to decompose without resort to high temperatures and drastic actions.

In any operation where lithia is a sole product, it must bear the entire cost and the commercial manufacture of lithium compounds is, therefore, unduly expensive.

In the present invention, we provide a simple, ready and economical method of processing certain lithium ores and recovering the lithia content; the method utilizing ordinary factory equipment and technique. The lithium, is in a sense, a side product; other valuable products helping to defray the cost of operation. The ores in question are the lithiferous native phosphates of alumina. These phosphates range from a zero content to about 8 or 9 per cent lithia ($Li_2O$); the amount found in pure normal crystallized amblygonite. Amblygonite is a double phosphate of aluminum and lithium associated with some fluorin; a fluorophosphate. Some of the Li may be replaced by K or Na and some of the Al by Fe; and the mineral as mined, for this reason and also because of the presence of the gangue, usually has a lithium content below the stated maximum figure. All these lithiferous native aluminum phosphates for the present purposes may be called amblygonite. The nearer they approach the composition of normal amblygonite, the better they are suited for the present purposes.

Irrespective of their lithium content, the amblygonites are good raw material for manufacturing purposes as sources of $P_2O_5$ and $Al_2O_3$. They readily yield their aluminum phosphate content on extraction with a hot solution of caustic soda, leaving gangue, iron oxid, etc., behind as an insoluble residue.

We have found that for some reason in this extraction, little of the lithium content goes into solution; most of the lithia remains behind with the insoluble residue. The amount dissolved in bringing the aluminum phosphate into solution is negligible. The result is somewhat surprising since the total amount of lithium per ton of ore is rather small and the quantity of solvent, relative to the lithia, rather large. The residue from the caustic soda extraction contains $P_2O_5$ and it is possible that the lithium remains in it as an insoluble complex phosphate or fluorophosphates, not broken up by the caustic soda used in bringing aluminum phosphate in solution. This residue is rich in $P_2O_5$.

In the first stage of our method, we treat the ore as a source of $P_2O_5$ and $Al_2O_3$. These go into the caustic soda solution and are recovered therefrom by methods not here material. This residue may be regarded as a lithia concentrate. Only a negligible amount of the lithia goes into the caustic soda solution.

In a succeeding stage of the process, this lithiferous residue is treated with a solution containing a mineral acid. A hot dilute sulfuric or muriatic (hydrochloric) acid is effective. Nitric acid can be used but it is more expensive. Phosphoric acid can be used, but it is better used in stages, as hereinafter explained. The acid treatment leaves practically nothing undissolved except the gangue; silica and silicates. The leached residue may be discarded. Practically all the lithia goes into the acid solution.

The lithiferous residue is, as stated, rich in $P_2O_5$ and it is often advantageous to reduce the amount of $P_2O_5$ prior to the acid treatment, incidentally recovering it. By removing excess $P_2O_5$, the consumption of reagents necessary in subsequent operations is considerably lessened and operation becomes more convenient. It has been found that by a preliminary acid treatment of the residue from the caustic digestion, about one third of the total $P_2O_5$ in the residue can be taken out without losing more than a trace of lithium in the extract. A convenient and economical acid reacting reagent for this purpose is a solution of monosodium phosphate used in such an amount that it is converted into disodium phosphate; a point marked by phenolphthalein neutrality. The disodium phosphate so formed comes out of the process and is treated in ordinary ways. The washed residue is then extracted with acid.

Instead of using monosodium phosphate, there can be a preliminary treatment with a little phosphoric acid solution. This also removes the excess $P_2O_5$ and if used in the right amount, the lithia remains undissolved.

The precipitate, stripped of excess $P_2O_5$ in the way described, is next extracted with an acid. Phosphoric acid, hydrochloric acid, or sulfuric acid may be used. The preliminary treatment to remove excess $P_2O_5$ may be omitted, but it is economical to use it. Phosphoric acid extraction can be used as a preliminary treatment. After the preliminary treatment with monosodium phosphate or phosphoric acid, as the case may be, to reduce the amount of $P_2O_5$ in the lithiferous material, it is leached with dilute sulfuric or hydrochloric acid as described.

The acid solution of the extract contains lithia and other bases, together with $P_2O_5$. It is next submitted to fractional precipitation with an alkaline precipitant; carbonate of soda (soda ash) being usually employed. Caustic alkalies, milk of lime, or even calcium carbonate may be used in this step-wise neutralization; but soda ash is most convenient.

The liquid usually, but not always, contains enough iron oxid and alumina to carry down the $P_2O_5$ as an insoluble phosphate as a first precipitate on the addition of a small amount of soda ash solution. If the liquid does not contain sufficient of these bases, more may be added to the acid liquid in the form of any suitable iron or aluminum salt, thereby enabling complete precipitation of $P_2O_5$ in this first operation. Instead of adding an iron or aluminum salt, soluble calcium or magnesium salts may be added in amount sufficient to supplement the bases present and give a complete precipitation of $P_2O_5$. Lime or calcium chlorid may be employed. The chlorids or sulfates of iron, aluminum or magnesium may be employed.

In the fractional precipitation to remove $P_2O_5$ as an insoluble phosphate, it is possible, as stated, to use lime as a neutralizing agent. Calcium carbonate is also effective. In so using lime or calcium carbonate as a neutralizing agent, a seperable addition of calcium or magnesium chlorid, or of magnesium sulfate, may become unnecessary.

The point in this preliminary neutralization is to add just enough base to carry down $P_2O_5$ in a first fractional precipitate as an insoluble phosphate of the bases present.

After the precipitation of the $P_2O_5$, we customarily filter the liquid. A further addition of soda ash now brings down lime and magnesia, together with any residual iron oxid or alumina. After this second precipitation, the liquid is filtered. The filtrate, which is rich in salines, is then concentrated as far as possible short of the point where crystallization of dissolved salts occurs. On now adding a rather large quantity of sodium carbonate, lithium carbonate is thrown down as a precipitate. The crude lithium carbonate is recovered by filtering, settling or centrifugal action. It may be purified in any of the known ways. Mother liquor may be recycled.

When desired, the lithium may be recovered in other forms than carbonate, such as the fluorid, phosphate, hydroxid, etc. In such case, instead of using sodium carbonate as the final precipitating agent, sodium fluorid, or sodium hydroxid, or sodium phosphate, etc., may be used.

In a specific embodiment of the present invention, one ton of crude amblygonite containing 8.63 per cent lithia and ground to 200 mesh, was digested with 2300 pounds of caustic soda as a 24 per cent solution. The ore and the caustic solution were heated together at a temperature of 200° F. A substantially complete solution of the aluminum phosphate occurred in about three hours. The magma of ore and alkaline solution was filter pressed and the cake washed with water. The extract and washings went forward for recovery of the $P_2O_5$ and the $Al_2O_3$. With this particular ore, the residue from the ton lot amounted to 1080 pounds on a dry basis and contained about 15 per cent lithia ($Li_2O$). It was digested with hot 35 per cent $H_2SO_4$ solution in sufficient amount to leave a clean residue. The washed residue went out of the system and was discarded. In this particular case, we added to the acid solution so made an iron salt in an amount equivalent to 270 pounds of ferric oxid. The liquid was treated with a solution of 600 pounds of soda ash; an amount insufficient to neutralize but sufficient to give a heavy brown precipitate of phosphates of iron and aluminum. This was removed and the acid filtrate was treated with enough soda ash to neutralize it and to bring down lime and magnesia. The filtrate and washings contained all the lithia. After a concentration of the filtrate to a point short of crystallization, a further addition to the liquid of 600 pounds of soda ash in solution brought down the lithia as crude lithium carbonate. The recovery of lithia in this particular operation was 83 per cent of that contained in the ore. The crude lithium carbonate was marketable as such.

In other operations, where we have used a solution of monosodium phosphate in a preliminary operation to extract some of the $P_2O_5$ of the precipitate as disodium phosphate, the amount of reagents subsequently used to bring the lithia in solution was considerably lessened.

What we claim is:—

1. A process of recovering lithia from amblygonite and similar aluminum phosphate minerals containing lithia and silicous gangue which comprises digesting the mineral in a caustic soda solution so as to take aluminum phosphate into solution and to concentrate lithia in insoluble form in a solid residue and extracting lithia from said residue by an acid treatment leaving a final residue of silica and silicates.

2. A process of recovering lithia from amblygonite ores which comprises digesting amblygonite with a caustic soda solution in sufficient amount to dissolve aluminum phosphate, removing the solution formed in said digestion from a lithiferous undissolved residue, extracting the residue with an acid and precipitating a lithium compound from said acid extract.

3. In the recovery of lithium compounds from ores containing lithiferous aluminum phosphates, a process which comprises digesting such an ore with hot caustic soda solution to decompose and dissolve the aluminum phosphate and to give a residue rich in lithia, extracting this residue with a dilute acid and fractionally precipitating the acid solution first with an alkali and then with a reagent adapted to precipitate a lithium compound, the first such precipitation taking down phosphates of metals other than lithium and the last precipitation throwing down a lithium compound.

4. In the process of claim 3, adding to the acid solution extract prior to precipitating phosphates one or more compounds of a metal, or metals, chosen from a group comprising iron, aluminum, calcium and magnesium.

5. In the process of claim 3, precipitating phosphates from the acid solution extract by treating said extract with lime.

6. In the process of claim 3, precipitating phosphates from the acid solution by treating said extract with sodium carbonate.

7. In the treatment of minerals containing lithiferous aluminum phosphate, a process which comprises digesting such an ore with hot caustic soda solution to decompose and dissolve the aluminum phosphate and to give a residue rich in lithia, removing some of the $P_2O_5$ contained in this residue by a preliminary extraction with an acid solution containing $P_2O_5$, then extracting the so-treated residue with a dilute acid and fractionally precipitating the acid solution obtained, first with an alkali and then with a reagent adapted to precipitate a lithium compound, the first such precipitation taking down phosphates and the last precipitation throwing down a lithium compound.

8. In the process of claim 7, extracting $P_2O_5$ from the lithiferous residue by a solution containing $P_2O_5$ as monosodium phosphate.

9. In the process of claim 7, extracting $P_2O_5$ from the lithiferous residue by a solution containing $P_2O_5$ as phosphoric acid.

10. In the recovery of lithium compounds from ores containing lithiferous aluminum phosphates, the process which comprises digesting such an ore with hot caustic soda solution to dissolve the aluminum phosphate and to give a residue rich in lithia, extracting this residue with a dilute acid and fractionally precipitating the acid solution with successive portions of sodium carbonate, the first such precipitation taking down phosphates of metals other than lithium and the last precipitation throwing down lithium carbonate.

11. In the utilization of amblygonite for the production of lithia, the process which comprises digesting amblygonite with a hot caustic soda solution in amount sufficient to dissolve aluminum phosphate, thereby producing a residue enriched in lithia, removing excess $P_2O_5$ from the residue and further enriching it in lithia by a preliminary treatment with an acid solution containing $P_2O_5$, extracting the enriched residue with acid to dissolve lithia, fractionally precipitating $P_2O_5$ from the extract as iron and aluminum phosphates and filtering, neutralizing the filtrate with sodium carbonate to throw down other bases and filtering, concentrating the filtrate just short of crystallization and precipitating lithium carbonate therefrom by an addition of sodium carbonate.

JOHN HARRY COLEMAN.
NED E. JAFFA.